(12) United States Patent
Little et al.

(10) Patent No.: US 11,978,314 B2
(45) Date of Patent: *May 7, 2024

(54) SYSTEM, METHOD, AND NON-TRANSITORY COMPUTER-READABLE STORAGE MEDIA FOR GENERATING DATA FOR USE IN CASINO PROPERTY MANAGEMENT COMPUTER SYSTEMS

(71) Applicant: Station Casinos LLC, Las Vegas, NV (US)

(72) Inventors: William Chad Little, Las Vegas, NV (US); Jon Von Tobel, Las Vegas, NV (US)

(73) Assignee: Station Casinos, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/976,515

(22) Filed: Oct. 28, 2022

(65) Prior Publication Data

US 2023/0177922 A1 Jun. 8, 2023

Related U.S. Application Data

(63) Continuation of application No. 16/457,276, filed on Jun. 28, 2019, now Pat. No. 11,488,447.

(Continued)

(51) Int. Cl.
*G07F 17/32* (2006.01)
*G06F 16/955* (2019.01)
*G06Q 30/0207* (2023.01)

(52) U.S. Cl.
CPC ........ *G07F 17/3255* (2013.01); *G06F 16/955* (2019.01); *G06Q 30/0209* (2013.01); *G06Q 30/0225* (2013.01); *G07F 17/3239* (2013.01)

(58) Field of Classification Search
CPC ............ G07F 17/3255; G07F 17/3239; G06F 16/955; G06Q 30/0209; G06Q 30/0225
See application file for complete search history.

(56) References Cited

U.S. PATENT DOCUMENTS

| 7,666,090 B2 | 2/2010 | Hettinger |
| 7,674,180 B2 | 3/2010 | Graham et al. |

(Continued)

OTHER PUBLICATIONS

Hing et al., "Do advertising and promotions for online gambling increase gambling consumption? An exploratory study," (published in International Gambling Studies, vol. 14, Issue 3, Apr. 2014, pp. 394-409) (Year: 2014).*

(Continued)

*Primary Examiner* — Resha Desai
*Assistant Examiner* — Patrick Kim
(74) *Attorney, Agent, or Firm* — Howard & Howard Attorneys PLLC

(57) ABSTRACT

A networked computer system for providing promotional awards to casino property patrons is described herein. The networked computer system includes a promotions management computer server including a processor programmed to execute an algorithm to receive an activity signal from at least one player tracking server indicating corresponding patron activity. The processor is programmed to determine whether the patron activity data indicates a qualifying promotional event, and responsively select a promotional award, generate an escrowed award record associated with the corresponding patron activity, and modify the award escrow data file to include the generated escrowed award record. The escrowed award record including a corresponding patron ID, a corresponding session ID, corresponding award fulfilment instructions including the selected promotional award, a property ID, and a device ID, corresponding (Continued)

messaging instructions including an award notification message, and a corresponding qualification status indicator indicating a qualified status.

20 Claims, 13 Drawing Sheets

Related U.S. Application Data

(60) Provisional application No. 62/691,497, filed on Jun. 28, 2018.

(56) References Cited

U.S. PATENT DOCUMENTS

| | | | | |
|---|---|---|---|---|
| 8,662,982 | B1* | 3/2014 | Smith | G07F 17/3244 |
| | | | | 463/31 |
| 8,753,194 | B2 | 6/2014 | Schneider et al. | |
| 9,293,000 | B2 | 3/2016 | Nelson et al. | |
| 9,685,039 | B2 | 6/2017 | Evans | |
| 2007/0054728 | A1 | 3/2007 | Hood | |
| 2008/0076571 | A1* | 3/2008 | Frerking | G07F 17/32 |
| | | | | 463/42 |
| 2011/0250974 | A1* | 10/2011 | Shuster | G07F 17/32 |
| | | | | 463/43 |
| 2013/0252724 | A1 | 9/2013 | Nicely et al. | |
| 2014/0141868 | A1* | 5/2014 | Kelly | G07F 17/3225 |
| | | | | 463/25 |
| 2018/0350194 | A1 | 12/2018 | Wolf et al. | |

OTHER PUBLICATIONS

Hing, Nerilee et al., Do advertising and promotions for online gambling increase gambling consumption? An exploratory study, International Gambling Studies, 2014, pp. 394-409, vol. 14, No. 3, Taylor & Francis.

* cited by examiner

| Patron ID | Tier Level | Status Credits | Points | Promotion Award Value |
|---|---|---|---|---|
| Player0110 | Gold | 10,252 | 1,250 | $300 |
| Player00235 | Platinum | 68,000 | 2,050 | $50 |
| Player03252 | Chairman | 353,320 | 10,250 | $125 |
| Player11256 | President | 125,000 | 12,023 | $5 |
| Player12002 | Preferred | 850 | 5,320 | $5 |

FIG. 6

| Card Level | Award Prize | Value | Selection Probability |
|---|---|---|---|
| High | Top Award | $100.00 | 0.05 |
| | Mid Award | Prize.005 | 0.25 |
| | Low Award | Prize.001 | 0.70 |
| Med | Top Award | $50.00 | 0.10 |
| | Mid Award | $20.00 | 0.20 |
| | Low Award | $5.00 | 0.70 |
| Low | Top Award | Prize.015 | 0.05 |
| | Mid Award | Prize.005 | 0.20 |
| | Low Award | Prize.001 | 0.75 |

FIG. 7

| Award Liability Value | Award Prize | Value | Selection Probability |
|---|---|---|---|
| $100,000 - $1,000,000 | Top Award | $100.00 | 0.05 |
| | Mid Award | Prize.005 | 0.25 |
| | Low Award | Prize.001 | 0.70 |
| $50,000- $99,999 | Top Award | $50.00 | 0.10 |
| | Mid Award | $20.00 | 0.20 |
| | Low Award | $5.00 | 0.70 |
| $0-49,999 | Top Award | Prize.015 | 0.05 |
| | Mid Award | Prize.005 | 0.20 |
| | Low Award | Prize.001 | 0.75 |

FIG. 8

| Patron ID | Activity Session ID | Device ID | Property ID | Patron Activity | Qualification Designation |
|---|---|---|---|---|---|
| Player0225 | GameSess020 | EMG.002 | Casino002 | Card-In | Qualifying |
| Player0252 | GameSess125 | MOBILE.02 | Casino001 | Log-Out | Disqualifying |
| Player0128 | GameSess036 | EGM.102 | Casino003 | < $5/hr slot | Disqualifying |
| Player3265 | AcctSess058 | KIOSK.02 | Casino002 | Card-In | Qualifying |
| Player0685 | SpaSess062 | POS.125 | Casino002 | Spa Purchase | Qualifying |

FIG. 9

| Promotion Type | Promotion Engine | Qualifying Event | Disqualifying Event |
|---|---|---|---|
| EGM Play | Slotpromo.pgm | Card-In; $/hr Slot play; | Card-out; Promo elapse time |
| Property Purchase | Purchasepromo.pgm | POS purchase | Promo elapse time |
| Mobile Access | Mobilepromo.pgm | Mobile log-in Mobile purchase | Mobile log-out; Promo elapse time |

FIG. 10

| Patron ID | Activity Session ID | Device ID | Property ID | Prize Award | Notification Program file | Qualification Flag ID "Qualified" |
|---|---|---|---|---|---|---|
| Player0225 | GameSess020 | EMG.002 | Casino002 | $5.00 | MSG.002 | True |
| Player0252 | GameSess125 | MOBILE.02 | Casino001 | Prize.001 | MSG.020 | False |
| Player0128 | GameSess036 | EGM.102 | Casino003 | Prize.020 | MSG.125 | False |
| Player3265 | AcctSess058 | KIOSK.02 | Casino002 | $5.00 | MSG.002 | True |
| Player0685 | SpaSess062 | POS.125 | Casino002 | $100.00 | MSG.165 | True |

FIG. 11

```
{
  "_id" : ObjectId("59f6470459fc7f001ce07314"),
  "promoUUID" : "4321e9f9-872df-4a43-81c8-fe45002345f",
  "segmentUUID" : "6870574cee005g3236e774ef",
  "customerUUID" : "97c604db-e9d7-4f7f-8aa7-f5f3b0295fdc",
  "sessionId" : "7ec1bb4b-ead2-40ca-918e-30fbec3c1f6d",
  "qualified" : false,
  "activeProperty" : "sunset",
  "activeEGMLocation" : "047805",
  "sessionStartDateTime" : ISODate("2017-10-29T14:24:20.573-0700"),
  "restrictToWinningProperty" : true,
  "awardCost" : NumberInt(10),
  "awardMessage" : {
    "body" : {
      "restrictToExpireFromCreditDate" : {
        "value" : NumberInt(1),
        "type" : "week"
      },
      "sourceMetaData" : {
        "eventPropertyGroup" : "10",
        "eventName" : "PC7O10D",
        "eventLevel" : "02"
      },
      "sourceItemId" : "6870574cee005g3236e774ef",
      "sourceItemType" : "segmentId",
      "sourceType" : "",
      "sourceServiceId" : "",
      "sourceService" : "",
      "sourceLocation" : "047805",
      "property" : "sunset",
      "amount" : NumberInt(10),
      "transactionType" : "credit",
      "account" : "xpcCMS"
    },
    "header" : {
      "customerUUID" : "97c604db-e9d7-4f7f-8aa7-f5f3b0295fdc",
      "tripId" : "ad8e0588-e1fc-45af-8339-2d2a90fb9f17",
      "originatorHeader" : {
        "location" : {
          "value" : "047805",
          "property" : "sunset",
          "type" : "egm"
        },
        "customerUUID" : "97c604db-e9d7-4f7f-8aa7-f5f3b0295fdc",
        "endDateTime" : "2017-10-29T20:31:25.000Z",
        "startDateTime" : "2017-10-29T20:31:25.000Z",
        "type" : "egm.slots",
        "sessionId" : "7ec1bb4b-ead2-40ca-918e-30fbec3c1f6d",
        "routingKey" : "egm.sunset.active",
        "eventDateTime" : "2017-10-29T21:23:48.753Z",
        "originatorId" : "125c0ce7-1d54-4519-81e0-f838da3ef511"
      },
      "originatorId" : "125c0ce7-1d54-4519-81e0-f838da3ef511",
      "eventDateTime" : "2017-10-29T21:23:48.875Z",
      "routingKey" : "ams.credit"
```

FIG. 12

```
            }
         },                                                    ⟵ 74
92 ⟶     "ismMessage" : {                              ⟵ 78
            "body" : {
               "magstripe" : "013042131416752748",
               "gamecode" : NumberInt(2),              ⟵ 86
               "messageToneABI" : true,
               "messageTimeToPlay" : NumberInt(10),
               "displayMessage" : "Congrats!!You won \\x17\\x01$10.00 free slot play!!",
               "creditValue" : NumberInt(1000),
               "account" : "xpc"
            },
            "header" : {                                ⟵ 88
               "tripId" : "ad8e0588-e1fc-45af-8339-2d2a90fb9f17",
               "routingKey" : "ism.sunset.sessionupdate",
               "customerUUID" : "97c604db-e9d7-4f7f-8aa7-f5f3b0295fdc",
               "eventDateTime" : "2017-10-29T21:24:20.570Z",
               "originatorHeader" : {
                  "location" : {
                     "value" : "047805",
                     "property" : "sunset",
                     "type" : "egm"
                  },
                  "customerUUID" : "97c604db-e9d7-4f7f-8aa7-f5f3b0295fdc",
                  "endDateTime" : "2017-10-29T20:31:25.000Z",
                  "startDateTime" : "2017-10-29T20:31:25.000Z",
                  "type" : "egm.slots",
                  "sessionId" : "7ec1bb4b-ead2-40ca-918e-30fbec3c1f6d",
                  "routingKey" : "egm.sunset.active",
                  "eventDateTime" : "2017-10-29T21:23:48.753Z",
                  "originatorId" : "125c0ce7-1d54-4519-81e0-f838da3ef511"
               },
               "originatorId" : "125c0ce7-1d54-4519-81e0-f838da3ef511"
            }
         },
         "clcBonusName" : "WOF",
         "__v" : NumberInt(0)
      }
```

FIG. 12 (cont.)

SYSTEM, METHOD, AND NON-TRANSITORY COMPUTER-READABLE STORAGE MEDIA FOR GENERATING DATA FOR USE IN CASINO PROPERTY MANAGEMENT COMPUTER SYSTEMS

CROSS-REFERENCE TO RELATED APPLICATION

This application is a continuation of U.S. patent application Ser. No. 16/457,276, filed Jun. 28, 2019, which claims the benefit of U.S. Provisional Patent Application Ser. No. 62/691,497, filed on Jun. 28, 2018, all of which are hereby incorporated by reference in their entirety for all purposes.

FIELD OF THE INVENTION

The present invention relates to networked computer systems for casino property management systems, and more particularly, to systems, methods, and computer-readable storage media that monitor activities of casino patrons across multiple casino properties and generates encrypted escrow data records to escrow promotional awards associated with patrons prior to award.

BACKGROUND OF THE INVENTION

At least some known casino management systems are programmed to monitor casino patron activities and qualify patrons for promotional awards based on the monitored activity to attract and retain patrons at casino properties. In addition, known casino management systems may be programmed to provide promotional awards upon the predefined event, such as a time of day, or day of the week. For example, known casino management systems may be programmed to provide a promotional award to each patron playing a qualifying electronic gaming machine at a predefined time of day. However, these known systems require a significant use of computing resources at the time of providing the promotional awards. For example, upon detecting the occurrence of the predefined event, the system must dedicate significant computer resources to quickly identify each qualified player, associated a promotional award to the player, and generate and transmit a notification message to the player to notify the players of the awards, which reduces the amount of resources available for other monitoring and reporting activities. If random trigger events are implemented, significant stand-by computer resources are required to maintain system operations during a trigger event. As such, these known systems are limited in their ability to quickly notify players of awards, and are non-scalable across multiple casino properties.

The present invention is aimed at one or more of the problems identified above.

SUMMARY OF THE INVENTION

In one aspect of the present invention, a networked computer system for providing promotional awards to casino property patrons is provided. The networked computer system includes a promotions management computer server including a processor programmed to execute an algorithm including receive an activity signal from at least one player tracking server indicating corresponding patron activity. The activity signal including a corresponding patron ID associated with a patron, a corresponding session ID associated with corresponding patron activity, patron activity data associated with the corresponding patron activity, a property ID indicating a corresponding casino property, and a device ID associated with a corresponding gaming device. The processor is programmed to determine whether the patron activity data indicates a qualifying promotional event, and responsively select a promotional award, generate an escrowed award record associated with the corresponding patron activity, and modify the award escrow data file to include the generated escrowed award record. The escrowed award record including the corresponding patron ID, the corresponding session ID, corresponding award fulfilment instructions including the selected promotional award, the property ID, and the device ID, corresponding messaging instructions including an award notification message, and a corresponding qualification status indicator indicating a qualified status.

In another aspect of the present invention, a method of operating a networked computer system for providing promotional awards to casino property patrons is provided. The method includes a processor of a promotions management computer server executing an algorithm to perform the steps of receiving an activity signal from at least one player tracking server indicating corresponding patron activity and determining whether the patron activity data indicates a qualifying promotional event. The activity signal including a corresponding patron ID associated with a patron, a corresponding session ID associated with corresponding patron activity, patron activity data associated with the corresponding patron activity, a property ID indicating a corresponding casino property, and a device ID associated with a corresponding gaming device. Upon determining the patron activity data indicates a qualifying promotional event, the processor performs the steps of selecting a promotional award, generating an escrowed award record associated with the corresponding patron activity, and modifying the award escrow data file to include the generated escrowed award record. The escrowed award record including the corresponding patron ID, the corresponding session ID, corresponding award fulfilment instructions including the selected promotional award, the property ID, and the device ID, corresponding messaging instructions including an award notification message, and a corresponding qualification status indicator indicating a qualified status.

In yet another aspect of the present invention, one or more non-transitory computer-readable storage media, having computer-executable instructions embodied thereon is provided. The computer-executable instructions cause at least one processor to execute an algorithm to generate an award escrow data file including a plurality of escrowed award records. Each escrowed award record including patron information including a patron ID and a unique session ID, award fulfilment instructions, messaging instructions, and a qualification status indicator indicating at least one of a qualified status and an unqualified status. The processor receives an activity signal from at least one player tracking server indicating corresponding patron activity and determines whether the patron activity data indicates a qualifying promotional event. The activity signal including a corresponding patron ID associated with a patron, a corresponding session ID associated with corresponding patron activity, patron activity data associated with the corresponding patron activity, a property ID indicating a corresponding casino property, and a device ID associated with a corresponding gaming device. Upon determining the patron activity data indicates a qualifying promotional event, the processor selects a promotional award, and generates an escrowed award record associated with the corresponding patron activity, and modifies the award escrow data file to include the generated escrowed award record. The escrowed award record including the corresponding patron ID, the corresponding session ID, corresponding award fulfilment instructions including the selected promotional award, the property ID, and the device ID, corresponding messaging instructions including an award notification message, and a corresponding qualification status indicator indicating a qualified status.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein:

FIGS. 6-12 are illustrations of exemplary data files generated by the server computer shown in FIG. 2, according to embodiments of the present invention;

Figure 1:
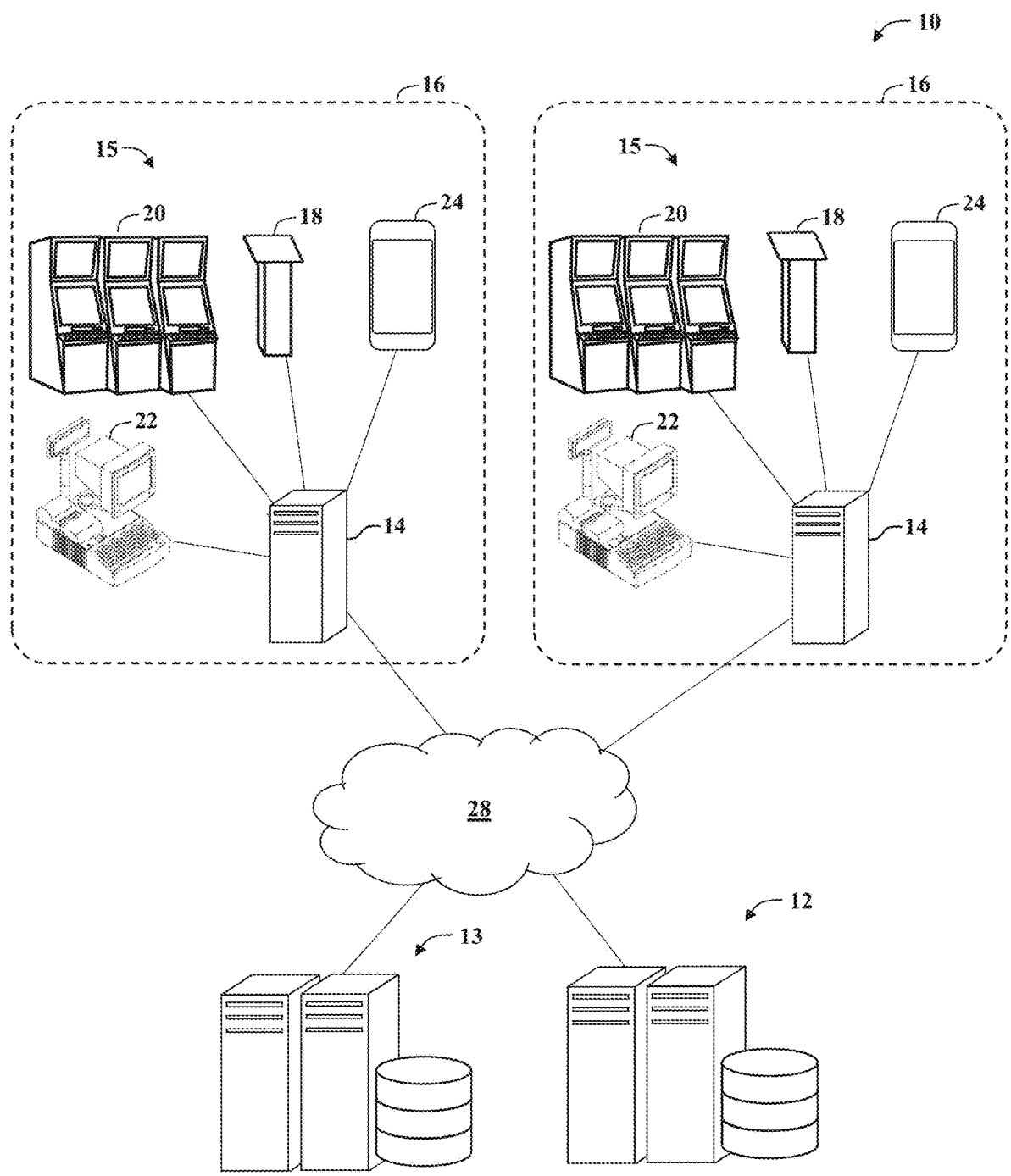
FIG. 1 is a schematic illustrating various aspects of a networked computer system for managing casino properties, according to the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION OF THE INVENTION

With reference to the FIGS. and in operation, the present invention provides a networked computer system, methods and computer product media that monitors the activities of casino patrons within multiple physical casino properties to provide random promotional awards to qualified casino patrons within the casino properties and provide simultaneous notifications of the promotional awards to each qualified patron at each casino property.

Referring to FIG. 1, an exemplary environment in which the networked computer system 10 operates is illustrated. In general, the present invention describes a networked computer system 10 for use in managing promotional awards across multiple casino properties and providing simultaneous notifications to patrons receiving promotional awards at each of the casino property locations. The system 10 initiates a promotional award period and monitors the gaming and purchasing activities of casino patrons as the patrons are physically located within a casino property to detect qualifying gaming and purchasing activities performed by patrons that qualify the patron for a promotional award. Upon detecting a qualifying promotional event performed by a patron, the system 10 randomly selects a promotional award and associates the randomly selected promotional award with the patron by generating an encrypted escrow account that includes information associated with the patron and the randomly selected promotional award. In addition, the escrow account record includes a modifiable qualification flag that can be modified to indicate a qualified and unqualified state. During the promotional award period, the system 10 continues to monitor the activities of the patron and modifies the qualification flag to the unqualified state upon detecting a disqualification activity performed by the patron.

The system 10 also detects a randomly occurring promotional award trigger event during the promotional period. Upon detecting the promotional award trigger event, the system 10 accesses the escrow account file, identifies qualified escrowed award records having the qualification flag in the qualified state, generates a notification message associated with each qualified escrow record including the corresponding promotional award, and transmits the notification messages to each patron associated with a qualified escrow account at each of the physical casino property locations. In addition, the system 10 accesses patron accounts associated with patrons receiving a promotional award and modifies the corresponding patron account to provide the promotional award to the patron.

The system 10 improves existing casino management systems by generating escrow account data files that include information that allows the system to associate randomly selected promotional awards to qualifying patrons before the promotional awards are provided and/or awarded to the patrons. Because the promotional awards are assigned to the patrons before the award trigger event has been detected, the amount of time and computer resources required to generate and transmit the award notification messages to the patrons is significantly reduced. In addition, the use of the escrow accounts enables the system 10 to simultaneously transmit award notifications to devices located at multiple casino properties, and enable a promotional award to occur simultaneously at each casino property. Moreover, the escrow accounts enables the system 10 to determine a total amount of promotional awards that may be awarded at any time during the promotional period.

In general, the system 10 is programmed to execute algorithms to implement a Random Celebration promotion that awards qualified players a prize when a configured Trigger Event Occurs. For example, in one embodiment, the system 10 is programmed to execute the Wheel-of-Fortune™ Big Time Bonus™ promotional award programmed offered by Station Casinos™. Only Players that have an active qualified session at the time of the event receive the prize. Awards are randomly selected from a weighted list of prizes. Different patron segments can be configured to allow for different prize configurations which get assigned to one or more marketing customer segmentations.

The system 10 is programmed to implement Flexible Event Triggers including, for example, 3rd Party Bonus Event such as Carded Lucky Coin; Random Selected card in event that hits play level; and/or Random Time Event. The system 10 may also be programmed to implement Patron Qualified Sessions that includes any type of session a player has can be used for the promotion including, for example, Carded Session on a Gaming Machine; Carded Session on a Table Game; Carded Session on a Kiosk; and/or Authenticated Session on a Mobile Device.

Patron Qualifications may include examples including a single or combination of the following: Player belongs to a specific Marketing List (group); Player Plays a Pre-determined level of play; Player begins session on a game that is qualified; Player begins session during a qualified date/time range; Player begins session at a property that is qualified; and/or Player is activity playing for a Pre-determined length of time.

During operation, the system selects a prize at the start of a qualified session to allow for maximum scalability across large number of machines and properties. For example, once a player becomes qualified for a given random celebration promotion, the player's prize is determined and securely escrowed at the time the qualifying event is detected, and will be awarded if the trigger event is hit. All prizes are encrypted and stored within a data store. If the player becomes unqualified before the trigger event, the record becomes unqualified but the system retains a history of all the qualifying sessions throughout the promotion period. Liability can be determined at any given point in time for all qualified players.

The system 10 also executes a Prize Delivery/Notification algorithm including, for example, when the qualified trigger event occurs all qualified players are immediately notified of their prize. Notification can occur as a Promotional Game on the Game Screen, a text message and or notification on their mobile device.

For clarity in discussing the various functions of the system 10, multiple computers and/or servers are discussed as performing different functions. These different computers (or servers) may, however, be implemented in multiple different ways such as modules within a single computer, as nodes of a computer system, etc. . . . . The functions performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

In the illustrated embodiment, the system 10 includes a promotions management computer server 12 that is coupled in communication with a casino management system server 13 and a plurality of player tracking servers 14 located at a plurality of casino property locations 16. The promotions management computer server 12 communicates with the casino management system server 13 and the player tracking servers 14 and executes algorithms to implement the Random Celebration promotions such as, for example, the Wheel-of-Fortune™ Big Time Bonus™ promotional award program. Each player tracking server 14 is coupled in communication with a plurality of gaming devices 15 that are located at a corresponding casino property 16 and are accessible by casino patrons to purchase goods and services provided by the casino property. Each server may include one or more server computers that each include a processing device that includes a processor that is coupled to a memory device. The processing device executes various programs, and thereby controls components of the server according to user instructions received from the gaming devices 15 and/or other servers. The processing device may include memory, e.g., read only memory (ROM) and random access memory (RAM), storing processor-executable instructions and one or more processors that execute the processor-executable instructions.

In the illustrated embodiment, the plurality of gaming devices 15 includes kiosks 18, electronic gaming machines (EMG) 20, a point-of-sale (POS) terminals 22, and user computing devices 24. The player tracking servers 14 monitor the purchases and activities of patrons and transmits the information to the promotions management computer server 12. The casino management system server 13 generates and maintains patron account records 26 (shown in FIG. 6) associated with each patron that includes information associated with the purchase and activities of patrons being monitored by the player tracking servers 14, which are then used to award promotional points to patrons that may be used to purchase additional goods and services from the casino properties. For example, the player tracking servers 14 are configured to tracking patrons wagering activity and game play on electronic gaming machines, table games and other gaming revenue areas such as, bingo, keno, and sports wagering. In addition, the player tracking servers 14 are configured to monitor patron purchases of casino property services such as restaurant, spa services, merchandise, hotel rooms and amenity services through non-gaming revenue POS terminals 22 and/or kiosks 18. Moreover, the player tracking servers 14 may be configured to monitor patron purchases and activities accessed using user computer software applications such as mobile software applications executed on mobile computing devices and/or websites. In some embodiments, the player tracking servers 14 and/or the casino management system server 13 identifies patrons using patron tracking ID cards and/or a patron identification numbers (PIN) that are linked to the patron account records 26. The casino management system server 13 tracks the patron's gaming play and may award patron tracking points, bonuses, and other incentives according to established criteria to promote continued patron loyalty. For example, in one embodiment, the casino management system server 13 may be configured to implement the myBoardingPass™ player rewards program offered by Station Casinos™.

The gaming devices 15, casino management system server 13, player tracking servers 14, and promotions management computer server 12 communicate via a communications network 28. The communications network 28 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed.

In the illustrated embodiment, each patron computing device includes a display device and a processing device that includes a processor that is coupled to a memory device. The processing device executes various programs, and thereby controls components of the computing device according to user instructions received by the user to enable the user to access and communicate with the system 10 including sending and/or receiving information to and from the system 10 and displaying information received from the system 10 to the user.

For example, in some embodiments, the user computing device 24 may include, but is not limited to, a desktop computer, a laptop or notebook computer, a tablet computer, smartphone/tablet computer hybrid, a personal data assistant, a handheld mobile device including a cellular telephone, and the like. In addition, the user computing device 24 may include a touchscreen that operates as the display device and the user input device. In the illustrated embodiment, the user computing device 24 includes a web-browser program that is stored in the memory device. When executed by the processor of the user computing device, the web-browser program enables the user computing device to receive software code from the system 10 including, but not limited to HTML, JavaScript, and/or any suitable programming code that enables the user computing device to generate and display a website and/or webpages on the display device of the user computing device.

Similarly, kiosks 18 may include a touchscreen display and processor for executing web-browser programs to receive software code from the system 10 and display a website and/or webpages on the touchscreen display. In addition, the kiosks 18 may also include a card reader device for obtaining patron ID's stored on the physical patron tracking ID cards.

In one embodiment, the user computing device 24 may include a mobile computing device such as, for example, a tablet computer, a smartphone/tablet computer hybrid, a smartphone such as an iPhone™, Samsung Galaxy™, and the like. The mobile computing device includes a processor coupled to a memory device for storing various programs and data for use in operating the mobile computing device. The mobile computing device may also include a touchscreen display unit, one or more video image cameras, one or more speakers, a microphone, at least one input button, and one or more sensors including, but not limited to, a touch ID fingerprint sensor coupled to an input button, a barometer, a three-axis gyro, an accelerometer, proximity sensor, and an ambient light sensor. In addition, the mobile computing device may also include a Wi-Fi antenna, a cellular network antenna, a Bluetooth™ communications device, assisted GPS and GLONASS, a digital compass, and an iBeacon™ microlocation device. The mobile computing device may be programmed to store and execute mobile computer program applications that display graphical user interfaces on the touchscreen display unit that allows the user to access the system 10 to retrieve and store information within the system 10 as well as interact with and operate the system 10. For example, the system 10 may be configured to implement a mobile application such as, for example, the "STN™" mobile application offered by Station Casinos™ available in Apple iOS™, Google Android™, and Amazon Kindle™ operating platforms, or on social-media websites such as Facebook™.

In some embodiments, the POS terminal 22 includes a computer processor, a monitor (e.g., a cashier-facing monitor), one or more input devices (e.g., scanners, keyboards, scales, or the like), one or more payment devices (e.g., cash drawers, card readers) for receiving or returning payments, one or more output devices (e.g., customer-facing display monitor, receipt printer), or the like or combinations or sub-combinations thereof, and a near field communication (NFC) device, such as, for example, an NFC dongle. The input devices and payment devices can feed data and commands to computer processor for processing or implementation. For example, a barcode scanner can pass data communicating the identity of one or more items to be purchased, returned, or the like to a computer processor. Similarly, a card reader can pass payment information and/or patron ID information to the computer processor. Similarly, customer-facing display and receipt printer can display or output data or information as instructed by the computer processor.

The electronic gaming machine (EMG) 20 includes a display device and a gaming controller that includes one or more gaming computer processors for generating and displaying a plurality of games on the display device. The gaming computer processor executes a wagering game program that uses a random number generator to randomly generate outcomes of the games, which allows a player to make a wager, play a game, and potentially provide the player an award based on an outcome of the game and a paytable. For example, in some embodiments, the EGM 20 executes a video slot machine that executes a game including a plurality of video reels displaying game symbols. The EGM 20 may also execute de any type of game including, but not limited to, a video slot game, a keno game, a blackjack game, a video poker game, or any type of game which allows a player to make a wager and potentially provide the player an award.

In some embodiments, the EGM 20 includes a user input device that includes a plurality of input buttons and an acceptor device that includes a coin slot and/or a bill acceptor. The acceptor device includes an input and output device that is configured to accept a bill, a ticket, and/or a cash card into the acceptor device to enable an amount of gaming credits associated with a monetary value of the bills, ticket, and/or cash card to be credited to the gaming device. For example, the acceptor device may utilize a cashless wagering system (not shown), such as a ticket in ticket out (TITO) system (not shown). The EGM 20 may also include a player tracking device that communicates with the player tracking server 14. The player tracking device includes a player identification card reader and a display. The player identification card reader is configured to accept a player tracking ID card inserted by the player, and read information contained on the player tracking card to identify the player account information. The player identification card reader may include, but is not limited to, a barcode reader, a magnetic card reader, and/or a radio frequency identification (RFID) card reader. The display device may include a touchscreen panel that includes a keypad to allow the player to enter a unique PIN that is used by the player tracking server 14 to identify the patron and the corresponding patron tracking account. The player tracking device is configured to communicate player account information and gaming activity between the player tracking server 14 and the EGM gaming controller. For example, the player tracking device may be used to track bonus points and/or credits awarded to the player during a gaming session and/or track bonus and/or credits downloaded to the EGM 20 from the player tracking server 14.

Figure 2:
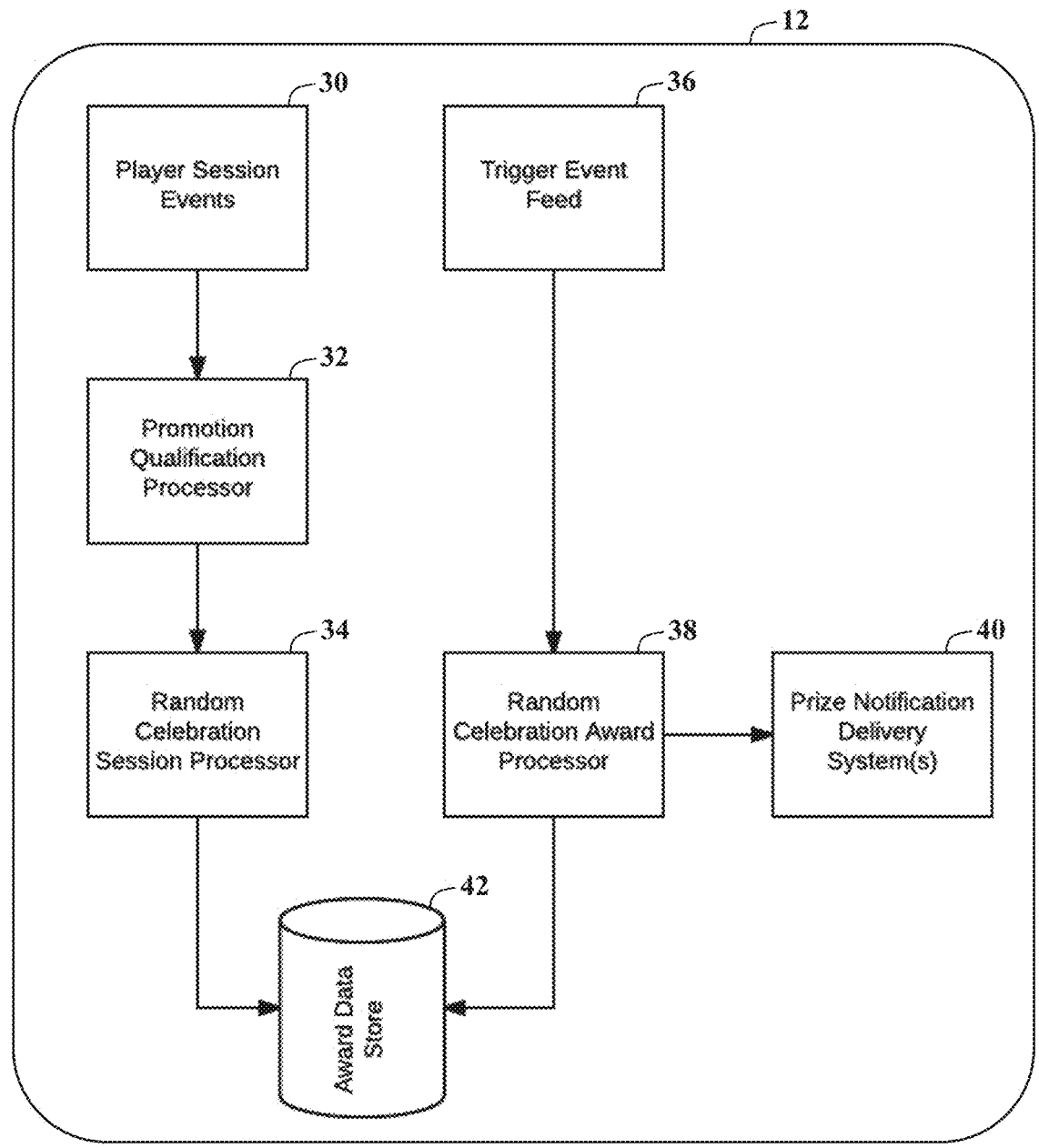
FIG. 2 is a schematic illustrating example components of a server computer that may be used with the system shown in FIG. 1, according to an embodiment of the present invention.
Figure 3:
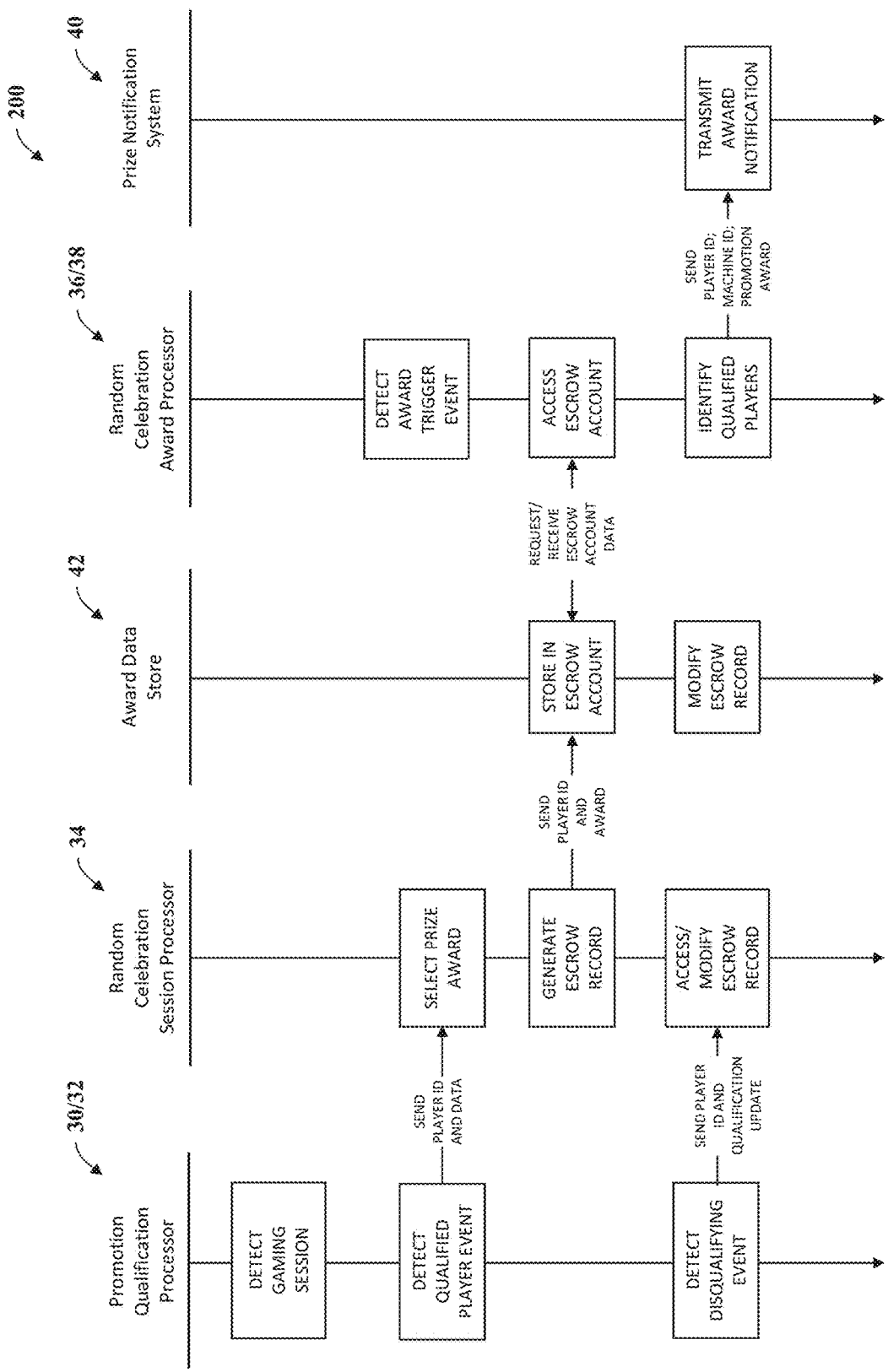
FIGS. 3-5 are flowcharts illustrating the algorithms executed by the server computer shown in FIG. 2, according to embodiments of the present invention.
Figure 4:
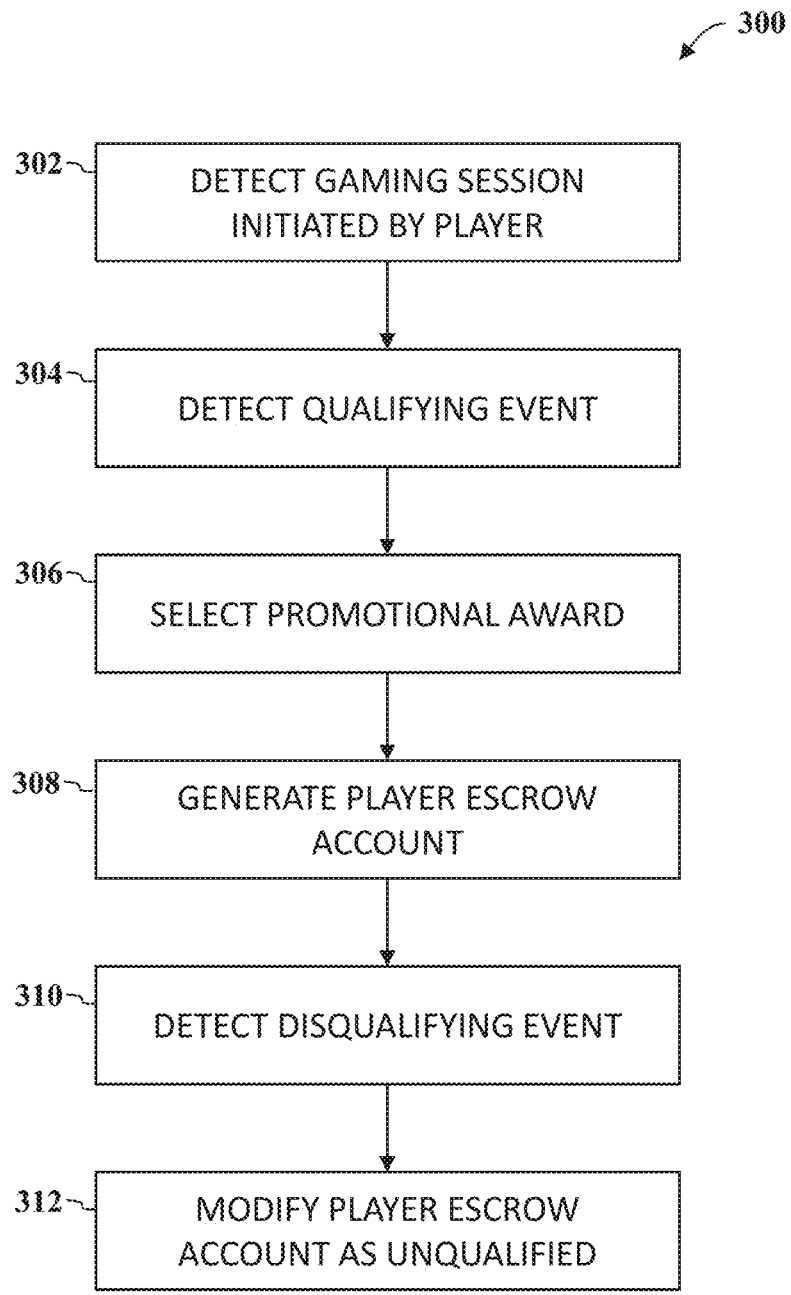
Figure 5:
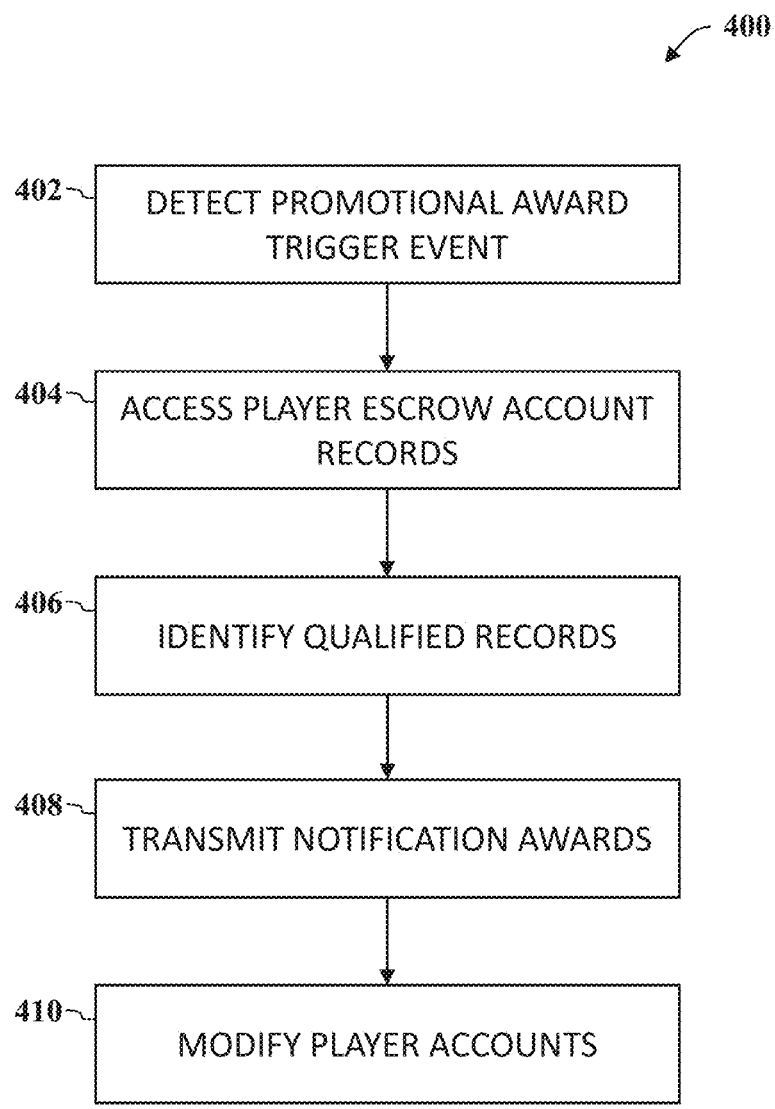
Figure 13:
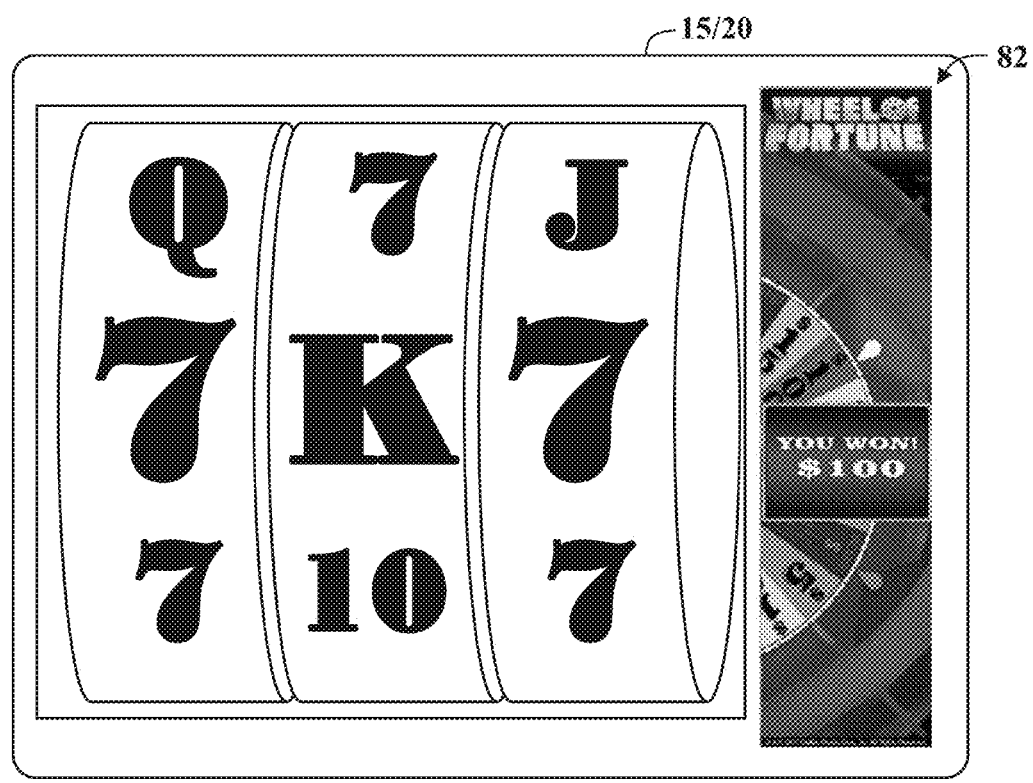
FIG. 13 is an illustrations of an exemplary game screen that may be displayed on an electronic gaming machine, according to embodiments of the present invention.
Figure 14A:
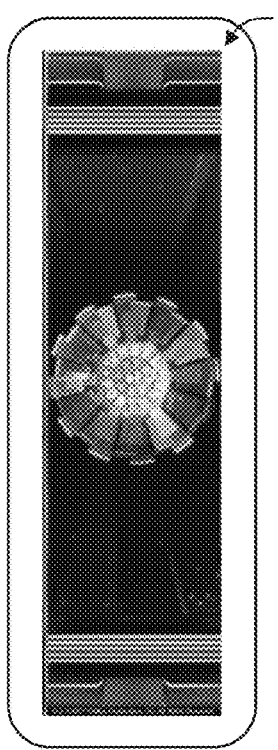
FIGS. 14A-14F are illustrations of a sequence of graphical computer images displaying an award notification game that may be displayed on the electronic gaming machine.
Figure 14B:
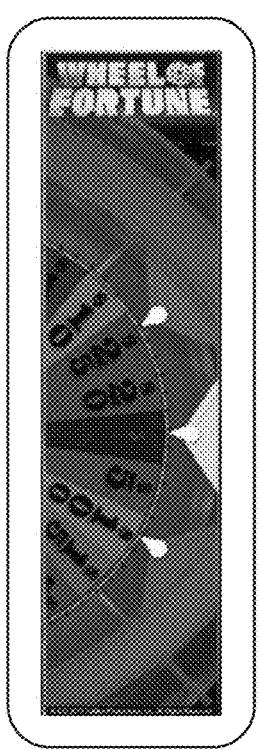
Figure 14C:
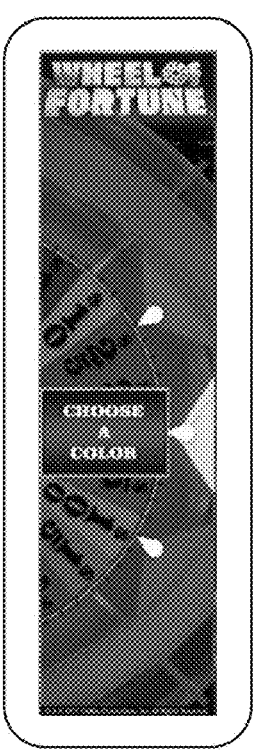
Figure 14D:
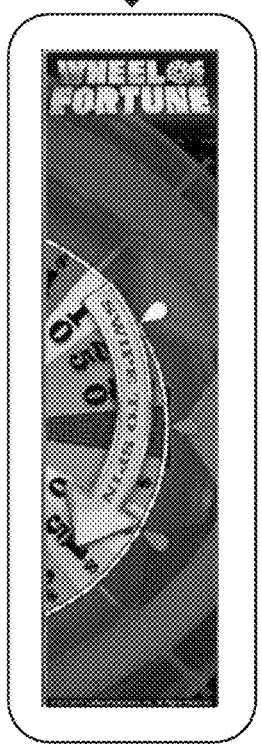
Figure 14E:
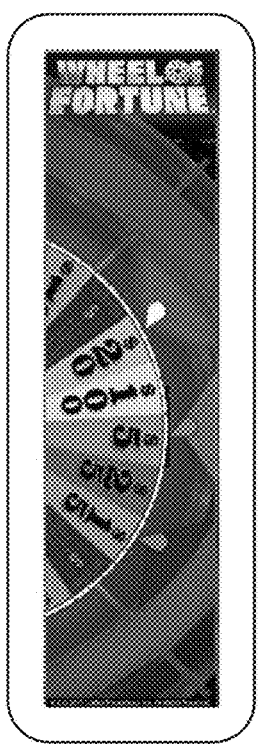
Figure 14F:

FIG. 2 is a schematic illustrating example components of the promotions management computer server 12. FIGS. 3-5 are flowcharts illustrating the algorithms 200, 300, and 400 executed by the promotions management computer server 12. The methods include a plurality of steps. Each method step may be performed independently of, or in combination with, other method steps. Portions of the methods may be performed by any one of, or any combination of, the components of the system 10. The promotions management computer server 12 includes one or more processors that are programmed to execute the algorithms shown in FIGS. 3-5, 13 and 14A-14F, and described herein. For example, in the illustrated embodiment, the promotions management computer server 12 includes a player session events processor 30, a promotion qualification processor 32, and random celebration session processor 34, a trigger event feed processor 36, a random celebration award processor 38, a prize notification delivery system processor 40, and an award data store 42. The award data store 42 includes a memory device that is connected to a database to retrieve and store information contained in the database. In one embodiment, the award data store 42 maintains a promotional award selection file 44 (shown in FIGS. 7-8) that includes information associated with a plurality of promotional awards such as, for example, a plurality of promotional award values and corresponding selection probabilities associated with each promotional award value. In addition, promotional award selection file 44 may include a plurality of tiered groups 46 that include promotional awards associated with various player card levels. In one embodiment, the promotional award selection file 44 may also include a plurality of promotional award paytables 48, 50, 52 including a plurality of awards (shown in FIG. 8). In one embodiment, the plurality of promotional award paytables may include including a high-value award paytable 48, medium-value award paytable 50, and a low-value award paytable 52. The high-value award paytable 48 includes awards having a higher monetary value than awards included in the medium-value award paytable 50, and the low-value award paytable 52. The medium-value award paytable 50 includes awards having a higher monetary value than awards included in the low-value award paytable 52. In general, the term "award" may be a payout, in terms of gaming credits or money. However, it should be understood that the term award may also refer to other types of awards, including, prizes, e.g., meals, show tickets, etc . . . , as well as in-game awards, such as free games.

Referring to FIGS. 2 and 3, the player session events processor 30 is programmed to communicate with the player tracking servers 14 to receive information associated with patron activities within the casino properties 16. In the illustrated embodiment, each player tracking server 14 detects an activity being performed by a patron using a patron tracking ID card and transmits information associated with the patron activity to the player session events processor 30. For example, in one embodiment, a player tracking server 14 may receive a signal from an EGM 20 indicating a player logging into their player tracking account by inserting a patron tracking ID card into a player tracking device and inputting a corresponding player PIN. The player tracking server 14 may monitor patron wagering activity at the EGM 20 and transmit information associated with the monitored patron wagering activity to promotions management computer server 12. In one embodiment, for example, the player tracking server 14 may transmit a patron activity data file 54 associated with the monitored patron activity including a Patron ID 56 received from patron tracking ID card, an activity session ID 58, a device ID 60 associated with the EGM 20, a property ID 62 indicating the corresponding casino property 16, and information associated with the wagering activity such as, for example, an amount of time at the EGM and/or an amount wagered over time. In another example, the player tracking server 14 may detect patron activities including accessing a kiosk 18 or mobile application via a mobile computing device, and/or purchasing goods and/or services via a POS terminal 22, and transmit information associated with the monitored patron activity to the promotions management computer server 12.

The promotion qualification processor 32 receives the data associated with the monitored patron activity from the player session events processor 30 and determines whether the monitored patron activity is a qualifying promotional event or a disqualifying promotional event. For example, the promotion qualification processor 32 may generate and store one or more promotional event data files 64 in the award data store 42 with each promotional event data file 64 including information associated with a promotional event including a list of qualifying events 66, a list of disqualifying events 68, and a predefined period of time associated with promotional event. For each monitored patron activity received from the player session events processor 30, the promotion qualification processor 32 accesses the promotional event data files 64 to determine which promotions are currently active, and whether the monitored patron activity is a qualifying event or a disqualifying event associated with a currently active promotion. A qualifying event includes patron activities that qualifies the patron as being eligible to receive an award associated with the corresponding promotion. A disqualifying event includes patron activities that disqualify the patron from being eligible to receive an award associated with the corresponding promotion. For example, in one embodiment a promotion may include qualifying events such as a predefine level of play at a slot machine over a predefined period of time and include disqualifying event such as terminating play at the slot machine or waging less than the predefined level of play. The promotion qualification processor 32 then designates the monitored patron activity as either qualifying or disqualifying, and transmits information associated with the designated monitored patron activity to the random celebration session processor 34. In some embodiments, the promotion qualification processor 32 modifies the received patron activity data file 54 to generate a designated patron activity data file 54 that includes a qualification designation tag 70 and transmits the designated patron activity data file 54 to the random celebration session processor 34 that includes a qualification designation tag 70 indicating whether the patron activity data file 54 includes a qualifying or disqualifying activity.

The random celebration session processor 34 is configured to generate and store encrypted award escrow account data files 72 (shown in FIGS. 11-12) based on the information associated with the designated patron activity data file 54 that is received from the promotion qualification processor 32. The award escrow account data files 72 includes a plurality of escrowed award records 74 that are associated with a promotional award associated with a patron. In one embodiment, the escrowed award records 74 may include a Patron ID 56 associated with a patron, a unique activity session ID 58 associated with the patron activity, a device ID 60 associated with a corresponding patron computing device, a property ID 62 associated with a casino property 16, a promotional prize award 76, a notification program file 78, and a qualification flag ID 80. The qualification flag ID 80 is modifiable to indicate a "qualified" status or a "unqualified" status. The notification program file 78 may include computer executable instructions for displaying notification images 82 (shown in FIGS. 13 and 14A-14F) and/or messages on the various gaming devices 15.

In one embodiment, as shown in FIG. 12, the random celebration session processor 34 is programmed to generate an escrowed award record 74 in JSON™ programming language including the Patron ID 56, the session ID 58, award fulfilment instructions 84 including the selected promotional award 76, the property ID 62, and the device ID 60, the notification program file 78 including corresponding messaging instructions 86 including an award notification message 82, and a corresponding qualification status indicator 80, i.e. the qualification flag ID, indicating a qualified status. For example, the escrowed award record 74 may include software code including primary contents: Routing code 88 for routing to the device and/or property; Prize Fulfillment code 90 including instructions for How the prize gets processed for the customer; Channel Display code 92 including instructions for How the delivery will be presented to the customer; and Award Source code 94 including instruction for determining the source that the prize originated from. e.g. a promotion hit Id.

In the illustrated embodiment, the random celebration session processor 34 is programmed to receive data associated with a designated patron activity data file 54 from the promotion qualification processor 32 and identify the designated patron activity data file 54 as being qualifying or disqualifying. Upon determining the designated patron activity data file 54 to be a qualifying activity, the random celebration session processor 34 accesses a promotional award selection file 44 being stored in the award data store 42, selects a promotional award using promotional award selection file 44, and generates an escrowed award record 74 to associate the selected promotional award to the patron.

For example, in one embodiment, the random celebration session processor 34 accesses the patron account records 26 using the patron ID associated with the designated patron activity data file 54 and determines a card tier level associated with the patron ID. The random celebration session processor 34 then accesses the award selection file 44, determines the tiered group 46 associated with the determined card tier level, and randomly selects a promotional award included in the determined tiered group.

In one embodiment, the random celebration session processor 34 may be programmed to determine an award liability value based on qualified escrowed award records include in the award escrow data file 72, and select a promotional award based on the determine award liability value. For example, as shown in FIG. 8, the award data store 42 may include the promotional award selection file 44 having the high-value award paytable 48, the medium-value award paytable 50, and the low-value award paytable 52. Each of the award paytables 48, 50, 52 may be associated with a different award liability value range. When generating the escrowed award record, the random celebration session processor 34 may be programmed to access the award escrow data file 72 and calculate the award liability value equal to a sum of the promotional awards included in escrowed award records having qualification status indicator indicating qualified status. The random celebration session processor 34 then identifies the award paytable having an award liability value range associated with the calculated award liability value, and randomly select a promotional award from the identified award paytable. For example, the random celebration session processor 34 may select the promotional award from the low-value award paytable 52 if the determined award liability value is greater than a predefined liability award liability value. In this manner, the random celebration session processor 34 may adjust subsequent award liability values, and thus adjust the total amount of promotional awards that may be awarded at any given time.

In the illustrated embodiment, upon selecting the promotional award, the random celebration session processor 34 generates a corresponding escrowed award record 74 including a qualification flag ID 80 identifying the corresponding escrow account record as "qualified", and stores the corresponding escrow account record in the award escrow account data files 72. In addition, in one embodiment, the random celebration session processor 34 generates a notification program file 78 including instructions for displaying the notification sequence of images shown in FIGS. 14A-14F, and stores the notification program file with the corresponding escrow account record. For example, the random celebration session processor 34 may determine a type of patron computing device based on the device ID included with designated patron activity data file 54 that is received from the promotion qualification processor 32, and generates and caches the notification program file 78 including instructions that are executable by the processing device of the corresponding patron computing device. For example, in one embodiment, the notification program file may include software code written in HTML and/or JavaScript for use in generating the notification sequence via webpages being displayed on the kiosk 18 or mobile computing device. In addition, the notification program file may include instruction for display a bonus wheel game (shown in FIGS. 14A-14F) that displays a bonus wheel on a display screen, such as, for example, an EGM display, and prompts the player to select a color and spin the wheel to reveal the promotional prize. In some embodiments, the notification program file includes the property ID and device ID.

In some embodiments, the random celebration session processor 34 may receive a designated patron activity data file 54 from the promotion qualification processor 32 indicating a disqualifying patron activity. Upon determining the designated patron activity data file 54 to be a disqualifying event, the random celebration session processor 34 accesses the award escrow account data files 72 and selects an escrowed award record 74 that includes a Patron ID and/or activity session ID matching the Patron ID and/or activity session ID included in the received designated patron activity data file 54 and modifies the qualification flag ID included in the selected escrow account record to indicate a "unqualified" status.

In one embodiment, upon receiving the patron activity data file 54, the promotion qualification processor 32 may access the award escrow account data files 72 to identify any existing escrowed award record 74 having a "qualified" stats and including a Patron ID matching the Patron ID included in the received patron activity data file 54. The promotion qualification processor 32 then modifies the received patron activity data file 54 to include a qualification flag ID indicating a "unqualified" status based on the identified "qualified" existing escrowed award record 74, and the random celebration session processor 34 generates a linked escrowed award record 74 having qualification flag ID indicating the "unqualified" status based on the previously identified "qualified" existing escrowed award record 74. If, at a later time, the identified "qualified" existing escrowed award record 74 is modified to "unqualified" status, the random celebration session processor 34 may also modify the linked escrowed award record 74 to a "qualified" status. By generating linked escrowed award records 74, the promotions management computer server 12 may be programmed to prevent a patron from having multiple "qualified" escrowed award records 74.

In the illustrated embodiment, the trigger event feed processor 36 is configured to randomly generate a trigger event signal and transmit the trigger event signal to the random celebration award processor 38. For example, in some embodiments, the trigger event feed processor 36 may be configured to execute a mystery trigger algorithm that includes randomly selecting a trigger event number from a range of numbers, initiating a counter, and transmitting the transmit the trigger event signal when the counter matches the randomly selected trigger event number. The trigger event feed processor 36 may also transmit the trigger event signal upon detecting a designated activity such as, for example, a randomly selected period of time, a detected patron activity, or a predefined activity.

Upon receiving the trigger event signal from the trigger event feed processor 36, the random celebration award processor 38 is programmed to access the award escrow account data files 72 and select escrowed award records 74 having qualification flag ID indicating a "qualified status". The random celebration award processor 38 then retrieves the notification program files and corresponding device IDs from each selected escrow account record and transmits a notification data file including the notification program files and the device IDs to the prize notification delivery system processor 40. Upon receiving the notification data files from the random celebration award processor 38, the notification delivery system processor 40 is programmed to identify each patron computing device based on the corresponding device IDs, and transmit the notification program files to each identified patron computing device which cause each patron computing device to display a prize notification to the corresponding patron. The notification delivery system processor 40 is also programmed to transmit the notification program files to each identified patron computing device such that each prize notification is displayed substantially simultaneously to each corresponding patron location at each casino property 16.

In some embodiments, upon receiving the trigger event signal from the trigger event feed processor 36, the random celebration award processor 38 is programmed to access the award escrow account data files 72, identify escrowed award records 74 having qualification flag ID indicating a "qualified status", and generate a promotion award file including each selected escrowed award records 74 having qualification flag ID indicating a "qualified status". The promotion award file may then be used to generate and/or transmits a notification data file including the notification program files and the device IDs to the prize notification delivery system processor 40, without affecting the award escrow account data files 72. This allows the random celebration session processor 34 to continually update the award escrow account data files 72 to include new escrowed award records 74 and/or modify existing escrowed award records 74 as the prize notification delivery system processor 40 delivers the notification messages. In some embodiment, upon receiving the trigger event signal the random celebration award processor 38 queries notification program files associated with escrowed award records 74 having qualification flag ID indicating a "qualified status", and transmits the queried notification program files to the prize notification delivery system processor 40, which then uses the property ID included in each notification program file to route the notification program files to the corresponding player tracking servers 14 for use in distributing the notification program files to the corresponding user devices based on the device ID included in each notification program file.

With reference to FIGS. 4-5, in the illustrated embodiment, the promotions management computer server 12 may be programmed to execute the algorithms 300 and 400 for providing promotional awards to casino property patrons. The methods include a plurality of steps that may be performed independently of, or in combination with, other method steps. Portions of the methods may be performed by any one of, or any combination of, the components of the promotions management computer server 12.

In the illustrated embodiment, the promotions management computer server 12 is coupled to a plurality of player tracking servers 14. Each player tracking server 14 is located at a different casino gaming property and is coupled to a plurality of gaming devices 15. Each player tracking server 14 is configured to detect patron activity at the gaming devices 15 and transmit data indicating the patron activity to the promotions management computer server 12. One or more processors of the promotions management computer server 12 are programmed assign promotion awards to the patron based on the patron activity and to generate and store the award escrow data file 72 in the award data store database 42. The award escrow data file 72 includes the plurality of escrowed award records 74. Each escrowed award record 74 includes patron information including a patron ID and a unique session ID, award fulfilment instructions, messaging instructions, and a qualification status indicator indicating at least one of a qualified status and an unqualified status. The award escrow data file 72 is used to provide the escrowed promotional awards to patrons that are then awarded to patron when a trigger event is later detected.

In method step 302, the processor of the promotions management computer server 12 receive an activity signal from at least one player tracking server indicating corresponding patron activity. The activity signal including a corresponding patron ID associated with a patron, a corresponding session ID associated with corresponding patron activity, patron activity data associated with the corresponding patron activity, a property ID indicating a corresponding casino property, and a device ID associated with a corresponding gaming device.

In method step 304, the processor determines whether the patron activity data indicates a qualifying promotional event. For example, in one embodiment, the processor accesses the promotional event data files 64 to determine which promotions are currently active, and whether the patron activity data is a qualifying event or a disqualifying event associated with a currently active promotion.

In method step 306, upon determining the patron activity data indicates a qualifying promotional event, the processor selects a promotional award. For example, in one embodiment, the processor accesses the promotional award selection file 44 being stored in the database 42 and selects a promotional award using promotional award selection file 44.

In one embodiment, the promotional award selection file 44 includes a plurality of promotional awards and selection probabilities associated with each promotional award. The processor may be programmed to randomly select the promotional award using the promotional award selection file. The promotional award selection file 44 may also include a plurality of tiered groups of promotional awards. Each tiered group is associated with a different patron ranking level. The processor may be programmed to identify a patron ranking level associated with the corresponding patron, and select the promotional award from the corresponding tiered group of promotional awards associated with the identified patron ranking level.

The processor may also be programmed to determine an award liability value upon determining the patron activity data indicates a qualifying promotional event and select the promotional award based on the determined award liability value. For example, the processor may determine the award liability value by accessing the award escrow data file and calculating the award liability value equal to a sum of the promotional awards included in escrowed award records having qualification status indicator indicating qualified status. The processor may then select the promotional award from the award paytables 48, 50, 52 (shown in FIG. 8) based on the determined award liability value. For example, the database 42 may include a plurality of promotional award paytables including a plurality of awards. The plurality of promotional award paytables may include a high-value award paytable 48 and a low-value award paytable 52, with the high-value award paytable including awards having a higher monetary value than awards included in the low-value paytable. The processor may select the promotional award from the high-value award paytable or the low-value award paytable based on the determined award liability value. For example, the processor may select the promotional award from the low-value award paytable if the determined award liability value is greater than a predefined liability award liability value.

In method step 308, the processor is programmed to generate an escrowed award record 74 associated with the corresponding patron activity. The escrowed award record 74 includes the corresponding patron ID, the corresponding session ID, corresponding award fulfilment instructions including the selected promotional award, the property ID, and the device ID, corresponding messaging instructions including an award notification message, and a corresponding qualification status indicator indicating a qualified status. The processor modifies the award escrow data file 72 to include the generated escrowed award record 74. In one embodiment, the corresponding award fulfilment instructions cause the casino management system server 13 to identify each patron account record associated with each patron ID and modify each patron account record to include the promotional awards. The messaging instructions cause each gaming device to display a corresponding award notification message.

In method step 310, the processor receives a subsequent signal from the least one player tracking server including the corresponding session ID and subsequent patron activity data associated with corresponding patron activity. The processor accesses the award escrow data file, identifies the escrowed award record associated with the corresponding session ID, and determines whether the subsequent patron activity data indicates a disqualifying promotional event.

In method step 312, upon determining the subsequent patron activity data indicates a disqualifying promotional event, the processor modifies the identified escrowed award record to change the qualification status indicator to unqualified status.

Referring to FIG. 5, in method step 402, the processor of the promotions management computer server 12 is programmed to detect a promotional award trigger event and initiation a promotional award event algorithm to simultaneously notify patrons of the escrowed promotional awards. For example, the processor may receive a triggering event signal from one of the plurality of player tracking servers and execute the promotional award event algorithm upon detecting the triggering event signal.

In method step 404, the processor accesses the award escrow data file 72 and identifies escrowed award records 74 having qualification status indicators indicating qualified status.

In method step 406, for each identified escrowed award records having qualification status indicator indicating qualified status, the processor executes the corresponding award fulfilment instructions to provide the selected promotional award to each patron, and executes the corresponding messaging instructions to display the award notification message on each corresponding gaming device.

In method step 408, the processor executes the promotional award event algorithm to transmit the messaging instructions 86 to each gaming device associated with each device ID to cause each gaming device to display a corresponding award notification message substantially simultaneously.

In method step 410, the processor transmits the award fulfilment instructions 84 to the casino management system server 13 to cause the casino management system server 13 to identify each patron account record 26 associated with each patron ID and modify each patron account record 26 to include the promotional awards.

In general, the system 10 includes a promotions management computer server 12 that is programmed to execute algorithms to implement a Random Celebration promotion that awards qualified players a prize when a configured Trigger Event Occurs such as, for example, the Wheel-of-Fortune™ Big Time Bonus™ promotional award programmed offered by Station Casinos™. The promotions management computer server 12 improves existing casino management systems by generating escrow account data files that includes randomly selected promotional awards associated with casino patrons. The escrow account data files are generated to include modifiable qualification flag IDs to enable the promotions management computer server 12 to change an escrow account record from "qualified" status to a "unqualified" status during as promotions period. The promotions management computer server 12 also uses the escrow accounts to transmit award notifications to gaming devices 15 located at multiple casino properties, to enable a promotional award notification to occur nearly simultaneously at each casino property. Moreover, the escrow accounts enables the system 10 to determine a total amount of promotional awards that may be awarded at any time during the promotional period. By generating escrow account data files with modifiable qualification status indicators, the system is able to associate randomly selected promotional awards to qualifying patrons before the promotional awards are provided and/or awarded to the patrons, which reduces the amount of time and computer resources required to transmit the award notification messages upon detecting a random trigger event, and enables the system to determine a total amount of promotional awards that may be awarded at any time during a promotional period, which are features not currently available in existing casino management systems.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, MongoDB™ database engines which is a document storage solution, Oracle® Database, MySQL, IBM® Db2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A networked computer system for providing promotional awards to casino property patrons, comprising:
    a player tracking server coupled to a plurality of gaming devices;
    a database including an award escrow data file including a plurality of escrowed award records, each escrowed award record including patron information including a patron ID and a unique session ID, award fulfilment instructions, messaging instructions, and a qualification status indicator indicating at least one of a qualified status and an unqualified status; and
    a promotions management computer server coupled to the player tracking server, the player tracking server configured to detect patron activity at the gaming devices and transmit data indicating the patron activity to the promotions management computer server, the promotions management computer server including a processor programmed to execute an algorithm including:
    receive an activity signal from the player tracking server indicating corresponding patron activity, the activity signal including a corresponding patron ID associated with a patron, a corresponding session ID associated with corresponding patron activity, patron activity data associated with the corresponding patron activity, a property ID indicating a corresponding casino property, and a device ID associated with a corresponding gaming device;

determine whether the patron activity data indicates a qualifying promotional event; and upon determining the patron activity data indicates a qualifying promotional event:

select a promotional award;

generate an escrowed award record associated with the corresponding patron activity, the escrowed award record including the corresponding patron ID, the corresponding session ID, and a notification program file including corresponding award fulfilment instructions including the selected promotional award, the property ID, the device ID, and corresponding messaging instructions including an award notification message and a routing code written in JSON programming language for routing the award notification message including: a routing key, the corresponding patron ID, an event timestamp, the device ID, a property ID, and a corresponding qualification status indicator indicating a qualified status; and modify the award escrow data file to include the generated escrowed award record; and upon detecting a triggering event, execute the algorithm to simultaneously display an animated sequence of computer-generated images on the plurality of gaming devices including the steps of:

querying the award escrow data file for qualified notification program files; and routing the queried qualified notification program files to the player tracking server;

wherein the player tracking server distributes the qualified notification program files to corresponding gaming devices based on device IDs included in the qualified notification program files; and wherein the qualified notification program files include computer executable instructions that cause the corresponding gaming devices to simultaneously display an animated sequence of computer-generated images indicating a corresponding promotional award.

2. The networked computer system of claim 1, wherein the processor is programmed to execute the algorithm including the steps of:

receiving a subsequent signal from the player tracking server indicating a card-out event associated with the patron ID; and modifying the escrowed award record to change the qualification status indicator to indicate an unqualified status.

3. The networked computer system of claim 1, wherein the processor is programmed to execute the algorithm including the steps of:

randomly selecting the promotional award from a plurality of promotional awards having different selection probabilities.

4. The networked computer system of claim 1, wherein the processor is programmed to execute the algorithm including the steps of:

identifying a patron ranking level associated with the patron ID; and selecting the promotional award from a plurality of tiered group of promotional awards associated with the identified patron ranking level.

5. The networked computer system of claim 1, wherein the processor is programmed to execute the algorithm including the steps of:

querying the award escrow data file for qualified escrowed award records having qualification status indicators indicating qualified status;

determining an award liability value based on corresponding promotional awards associated with the qualified escrowed award records; and selecting the promotional award based on the determined award liability value.

6. The networked computer system of claim 5, wherein the processor is programmed to execute the algorithm including the steps of:

selecting the promotional award from a high-value award paytable or a low-value award paytable based on the determined award liability value.

7. The networked computer system of claim 6, wherein the processor is programmed to execute the algorithm including the steps of:

selecting the promotional award from the low-value award paytable if the determined award liability value is greater than a predefined award liability value.

8. A method of operating a networked computer system including a player tracking server coupled to a plurality of gaming devices, a database including an award escrow data file including a plurality of escrowed award records, and a promotions management computer server including a processor coupled to the player tracking server and the database, wherein each escrowed award record including patron information including a patron ID and a unique session ID, award fulfilment instructions, messaging instructions, and a qualification status indicator indicating at least one of a qualified status and an unqualified status, and wherein the player tracking server is configured to detect patron activity at the gaming devices and transmit data indicating the patron activity to the promotions management computer server, the method including the processor executing an algorithm including the steps of:

receiving an activity signal from the player tracking server indicating corresponding patron activity, the activity signal including a corresponding patron ID associated with a patron, a corresponding session ID associated with corresponding patron activity, patron activity data associated with the corresponding patron activity, a property ID indicating a corresponding casino property, and a device ID associated with a corresponding gaming device;

determining whether the patron activity data indicates a qualifying promotional event; and upon determining the patron activity data indicates a qualifying promotional event:

selecting a promotional award;

generating an escrowed award record associated with the corresponding patron activity, the escrowed award record including the corresponding patron ID, the corresponding session ID, and a notification program file including corresponding award fulfilment instructions including the selected promotional award, the property ID, the device ID, and corresponding messaging instructions including an award notification message and a routing code written in JSON programming language for routing the award notification message including: a routing key, the corresponding patron ID, an event timestamp, the device ID, a property ID, and a corresponding qualification status indicator indicating a qualified status; and modifying the award escrow data file to include the generated escrowed award record; and upon detecting a triggering event, executing the algorithm to simultaneously display an animated sequence of computer-generated images on the plurality of gaming devices including the steps of:

querying the award escrow data file for qualified notification program files; and routing the queried qualified notification program files to the player tracking server;

wherein the player tracking server distributes the qualified notification program files to corresponding gaming devices based on device IDs included in the qualified notification program files; and wherein the qualified notification program files include computer executable instructions that cause the corresponding gaming devices to simultaneously display an animated sequence of computer-generated images indicating a corresponding promotional award.

9. The method of claim 8, including the processor performing the algorithm including the steps of:

receiving a subsequent signal from the player tracking server indicating a card-out event associated with the patron ID; and modifying the escrowed award record to change the qualification status indicator to indicate an unqualified status.

10. The method of claim 8, including the processor performing the algorithm including the steps of:

randomly selecting the promotional award from a plurality of promotional awards having different selection probabilities.

11. The method of claim 8, including the processor performing the algorithm including the steps of:

identifying a patron ranking level associated with the patron ID; and selecting the promotional award from a plurality of tiered group of promotional awards associated with the identified patron ranking level.

12. The method of claim 8, including the processor performing the algorithm including the steps of:

querying the award escrow data file for qualified escrowed award records having qualification status indicators indicating qualified status;

determining an award liability value based on corresponding promotional awards associated with the qualified escrowed award records; and selecting the promotional award based on the determined award liability value.

13. The method of claim 12, including the processor performing the algorithm including the steps of:

selecting the promotional award from a high-value award paytable or a low-value award paytable based on the determined award liability value.

14. The method of claim 13, including the processor performing the algorithm including the steps of:

selecting the promotional award from the low-value award paytable if the determined award liability value is greater than a predefined award liability value.

15. A non-transitory computer-readable storage media having computer-executable instructions embodied thereon to operate a networked computer system including a player tracking server coupled to a plurality of gaming devices, a database including an award escrow data file including a plurality of escrowed award records, and a promotions management computer server including a processor coupled to the player tracking server and the database, wherein each escrowed award record including patron information including a patron ID and a unique session ID, award fulfilment instructions, messaging instructions, and a qualification status indicator indicating at least one of a qualified status and an unqualified status, and wherein the player tracking server is configured to detect patron activity at the gaming devices and transmit data indicating the patron activity to the promotions management computer server, when executed by the processor the computer-executable instructions cause the processor to execute an algorithm including the steps of:

receiving an activity signal from the player tracking server indicating corresponding patron activity, the activity signal including a corresponding patron ID associated with a patron, a corresponding session ID associated with corresponding patron activity, patron activity data associated with the corresponding patron activity, a property ID indicating a corresponding casino property, and a device ID associated with a corresponding gaming device;

determining whether the patron activity data indicates a qualifying promotional event; and upon determining the patron activity data indicates a qualifying promotional event:

selecting a promotional award;

generating an escrowed award record associated with the corresponding patron activity, the escrowed award record including the corresponding patron ID, the corresponding session ID, and a notification program file including corresponding award fulfilment instructions including the selected promotional award, the property ID, the device ID, and corresponding messaging instructions including an award notification message and a routing code written in JSON programming language for routing the award notification message including: a routing key, the corresponding patron ID, an event timestamp, the device ID, a property ID, and a corresponding qualification status indicator indicating a qualified status; and modifying the award escrow data file to include the generated escrowed award record; and upon detecting a triggering event, executing the algorithm to simultaneously display an animated sequence of computer-generated images on the plurality of gaming devices including the steps of:

querying the award escrow data file for qualified notification program files; and routing the queried qualified notification program files to the player tracking server;

wherein the player tracking server distributes the qualified notification program files to corresponding gaming devices based on device IDs included in the qualified notification program files; and wherein the qualified notification program files include computer executable instructions that cause the corresponding gaming devices to simultaneously display an animated sequence of computer-generated images indicating a corresponding promotional award.

16. The non-transitory computer-readable storage media of claim 15, wherein the computer-executable instructions cause the processor to perform the algorithm including the steps of:

receiving a subsequent signal from the player tracking server indicating a card-out event associated with the patron ID; and modifying the escrowed award record to change the qualification status indicator to indicate an unqualified status.

17. The non-transitory computer-readable storage media of claim 15, wherein the computer-executable instructions cause the processor to perform the algorithm including the steps of:

randomly selecting the promotional award from a plurality of promotional awards having different selection probabilities.

18. The non-transitory computer-readable storage media of claim 15, wherein the computer-executable instructions cause the processor to perform the algorithm including the steps of:
identifying a patron ranking level associated with the patron ID; and
selecting the promotional award from a plurality of tiered group of promotional awards associated with the identified patron ranking level.

19. The non-transitory computer-readable storage media of claim 15, wherein the computer-executable instructions cause the processor to perform the algorithm including the steps of:
querying the award escrow data file for qualified escrowed award records having qualification status indicators indicating qualified status;
determining an award liability value based on corresponding promotional awards associated with the qualified escrowed award records; and
selecting the promotional award based on the determined award liability value.

20. The non-transitory computer-readable storage media of claim 19, wherein the computer-executable instructions cause the processor to perform the algorithm including the steps of:
selecting the promotional award from a high-value award paytable or a low-value award paytable based on the determined award liability value.

* * * * *